(12) United States Patent
Schad et al.

(10) Patent No.: US 11,167,463 B2
(45) Date of Patent: Nov. 9, 2021

(54) THREADED ARTICLE REMOVAL DEVICE FOR AN INJECTION MOLDING MACHINE

(71) Applicant: Niigon Machines Ltd., Vaughan (CA)

(72) Inventors: Robert D. Schad, Toronto (CA); Luke Osmokrovic, Toronto (CA)

(73) Assignee: NIIGON MACHINES LTD., Vaughan (CA)

( * ) Notice: Subject to any disclaimer, the term of this patent is extended or adjusted under 35 U.S.C. 154(b) by 0 days.

(21) Appl. No.: 16/296,667

(22) Filed: Mar. 8, 2019

(65) Prior Publication Data

US 2019/0202097 A1 Jul. 4, 2019

Related U.S. Application Data

(63) Continuation of application No. PCT/CA2017/051086, filed on Sep. 15, 2017.
(Continued)

(51) Int. Cl.
*B29C 45/17* (2006.01)
*B29C 45/42* (2006.01)
(Continued)

(52) U.S. Cl.
CPC ............ *B29C 45/178* (2013.01); *B29C 45/04* (2013.01); *B29C 45/42* (2013.01); *B29C 45/4225* (2013.01); *B29L 2001/007* (2013.01)

(58) Field of Classification Search
CPC ... B29C 45/178; B29C 45/04; B29C 45/4225; B29L 2001/007
See application file for complete search history.

(56) References Cited

U.S. PATENT DOCUMENTS 2,342,251 A 2/1944 Burt
2,522,736 A 9/1950 Zagar
(Continued)

FOREIGN PATENT DOCUMENTS

CN 102414004 A 4/2012
CN 2015148820 U 4/2016
(Continued)

OTHER PUBLICATIONS

Rosato, D.V. et al., Injection Molding Handbook, Springer Science & Business Media, Dec. 6, 2012 (Dec. 6, 2012), pp. 1256-1258 (Year: 2012).*
(Continued)

*Primary Examiner* — Yung-Sheng M Tsui
(74) *Attorney, Agent, or Firm* — Bereskin & Parr LLP/S.E.N.C.R.L, S.R.L.

(57) ABSTRACT

An injection molding machine includes a first mold section comprising mold cores for forming threaded articles, the first mold cores movable between a molding position for interacting with a second mold section in a mold area to form the threaded articles, and an auxiliary position outside the mold area, and a removal device for removing the threaded articles from the mold cores. The removal device includes a plurality of unscrewing chucks for engaging the threaded articles when the mold cores are in the auxiliary position. The chucks are supported by a carrier plate and each chuck is rotatable about a respective unscrewing axis. The removal device further includes an orbiting plate coupled to the unscrewing chucks by respective crank arms, the orbiting plate effecting synchronized rotation of the unscrewing chucks via the crank arms for unscrewing the threaded articles from the mold cores.

24 Claims, 12 Drawing Sheets

Related U.S. Application Data (60) Provisional application No. 62/395,107, filed on Sep. 15, 2016.

(51) Int. Cl.
*B29C 45/04* (2006.01)
*B29L 1/00* (2006.01)

(56) References Cited

U.S. PATENT DOCUMENTS

| | | |
|---|---|---|
| 3,084,387 A | 4/1963 | Tochner et al. |
| 3,279,268 A | 10/1966 | Zagar |
| 3,328,844 A | 7/1967 | Rees |
| 3,559,495 A | 2/1971 | Ludwig |
| 4,260,301 A | 4/1981 | Reiman |
| 4,594,037 A | 6/1986 | Haga et al. |
| 5,383,780 A | 1/1995 | McCready et al. |
| 7,157,037 B2 | 1/2007 | Seidelman et al. |
| 8,025,828 B2 | 9/2011 | Armbruster |
| 8,672,668 B2 | 3/2014 | Armbruster |
| 2012/0088000 A1 | 4/2012 | Armbruster |
| 2013/0302457 A1 | 11/2013 | Zahoransky |
| 2016/0075065 A1* | 3/2016 | Yokoyama ......... B29C 45/1775 425/574 |

FOREIGN PATENT DOCUMENTS

| | | |
|---|---|---|
| EP | 0402967 A1 | 12/1990 |
| GB | 631495 A | 11/1949 |
| GB | 972331 A | 10/1964 |
| KR | 20060024473 A | 3/2006 |

OTHER PUBLICATIONS

International Search Report and Written Opinion of corresponding International Application No. PCT/CA2017/051086 dated Dec. 18, 2017.

D.V. Rosato et al., Injection Molding Handbook, Springer Science & Business Media, Dec. 6. 2012, pp. 1256-1258.

* cited by examiner

THREADED ARTICLE REMOVAL DEVICE FOR AN INJECTION MOLDING MACHINE

This application is a continuation of International Application No. PCT/CA2017/051086, filed Sep. 15, 2017, which claims the benefit of U.S. Provisional Application Ser. No. 62/395,107, filed Sep. 15, 2016, each of which is hereby incorporated herein by reference.

FIELD

The disclosure relates to injection molding machines, and methods, assemblies, and apparatuses for removing threaded articles in an injection molding machine.

BACKGROUND

U.S. Pat. No. 8,025,828 (Armbruster) discloses an injection molding device with a first mold half and a second mold half, arranged movably with respect to said first half, and a central mold half arranged between said first and second halves and rotatable about an axis of rotation. Arranged to the side of the central mold half is a further processing device.

U.S. Pat. No. 3,328,844 (Rees) discloses an unthreading attachment for an injection molding machine providing for the unthreading of injection-molded articles which permits the simultaneous withdrawal of a plurality of articles from the mold and thereby expedites the production of the articles. An important feature of the disclosed invention resides in the oscillating movement of the mold member between an injection-molding station and an unthreading station, thereby eliminating a continuous displacement of a mold plate or the like, and enabling a conventional mold member with associated cooling means (e.g., water inlet and outlet lines) to be used without requiring complex connectors or the like.

U.S. Pat. No. 3,559,495 (Ludwig) discloses a gearless multiple spindle drive which includes a drive crank having a drive shank and a crank body. The crank body is provided with an eccentric crank socket which is offset from the center of the drive shank to establish the throw of the drive crank. An oscillator plate is received in the socket for oscillatory rotation relative to the crank body and for non-rotative, circular, translatory motion relative to surrounding space. A plurality of driven cranks are drivingly engaged by the oscillator plate and have the same throw as the drive crank. The driven cranks have shanks which are carried by a housing. The housing is restrained against rotation. Bearings rotatably support the drive crank on the housing.

SUMMARY

The following summary is intended to introduce the reader to various aspects of the applicant's teaching, but not to define any invention.

According to some aspects, an injection molding machine includes (a) a first mold section comprising mold cores for forming threaded articles. The mold cores are movable between a molding position for interacting with a second mold section in a mold area to form the threaded articles, and an auxiliary position outside the mold area. The machine further includes (b) a removal device for removing the threaded articles from the mold cores. The removal device includes: (i) a plurality of unscrewing chucks for engaging the threaded articles when the mold cores are in the auxiliary position. Each chuck is supported by a carrier plate and is rotatable about a respective unscrewing axis. The removal device further includes (ii) an orbiting plate coupled to the unscrewing chucks by respective crank arms. The orbiting plate effects synchronized rotation of the unscrewing chucks via the crank arms for unscrewing the threaded articles from the mold cores.

In some examples, each crank arm can transfer circular motion of the orbiting plate to rotation of a respective one of the unscrewing chucks about the respective unscrewing axis. In some examples, each crank arm can have an axial end that is coupled to a respective unscrewing chuck and is fixed to rotate with the unscrewing chuck about the respective unscrewing axis, and an orbiting end disposed radially outward of the respective unscrewing axis and coupled to the orbiting plate by a crank pin.

In some examples, the orbiting ends of the crank arms can be, in a direction parallel to the unscrewing axes, spaced farther away from the carrier plate than the axial ends of the crank arms to provide an offset gap between a back surface of the carrier plate and a facing surface of the orbiting ends of each crank arm. In some examples, each crank arm can have an axial end thickness measured in a direction parallel to the respective unscrewing axis, and the offset gap can be greater than the axial end thickness. In some examples, each offset gap can accommodate a portion of the axial end of an adjacent crank arm during operation of the orbiting plate.

In some examples, the machine can include at least one drive shaft for effecting circular motion of the orbiting plate. The drive shaft can be rotatable about a drive axis disposed in fixed position relative to the carrier plate. The drive shaft can be coupled to the orbiting plate by a drive pin disposed radially outward of the drive axis. In some examples, the drive pin can be fixed to the drive shaft and can be received in a bearing mounted in fixed position to the orbiting plate.

In some examples, the unscrewing chucks can include grip members for contacting the threaded articles and inhibiting relative rotation between the unscrewing chucks and the threaded articles.

In some examples, each unscrewing chuck can include a fluid orifice in communication with a fluid source for establishing at least one of positive pressure and negative pressure between a proximate surface of the unscrewing chuck and an adjacent surface of the threaded article.

In some examples, the machine can include a header conduit fixed to the carrier plate and in communication with the fluid source, and at least one branch conduit providing fluid communication between the header conduit and the fluid orifice of at least one of the unscrewing chucks.

In some examples, each unscrewing chuck can be supported by a respective spindle received in a respective bore passing through a thickness of the carrier plate. The branch conduit can extend through at least a portion of the spindle. In some examples, at least a portion of the header conduit can be disposed in the thickness of the carrier plate.

In some examples, the carrier plate can include a front wall of a housing. The housing can define an interior housing enclosure. The orbiting plate can be disposed within the housing enclosure. In some examples, the housing enclosure can be at least partially filled with a lubricating fluid.

In some examples, the carrier plate is movable from an advanced position in which the chucks engage the threaded articles on the mold cores, to at least one retracted position in which the chucks and threaded articles retained therein are clear of the mold cores. In the example illustrated, the machine can include an unscrewing slide oriented parallel to the unscrewing axes and supporting the carrier plate. The carrier plate can be retractable along the unscrewing slide from the advanced position to a first retracted position in which the chucks and threaded articles retained therein are clear of the mold cores.

In some examples, the carrier plate can be movable to a second retracted position spaced away from the first retracted position. In some examples, the threaded articles can be removed from the chucks when the carrier plate is in the second retracted position. In some examples, the carrier plate is pivotable about a generally vertical pivot axis to move between the first and second retracted positions.

According to some aspects, a removal device for removing threaded articles from a mold section of an injection molding machine includes: (a) a carrier plate; and (b) a plurality of unscrewing chucks supported by the carrier plate. Each chuck is rotatable about a respective unscrewing axis; The removal device further includes (c) an orbiting plate coupled to the unscrewing chucks by a plurality of crank arms. The orbiting plate effects synchronized rotation of the unscrewing chucks via the crank arms for unscrewing respective threaded articles from the mold section.

In some examples, each unscrewing chuck can accommodate axial translation of a respective threaded article along the respective unscrewing axis during said unscrewing from the mold section. In some examples, each unscrewing chuck can translate along the respective unscrewing axis during said unscrewing from the mold section. In some examples, each unscrewing chuck can be supported by a respective spindle received in a respective bore passing through a thickness of the carrier plate. In some examples, each unscrewing chuck can be releasably coupled to a front end of the respective spindle.

According to some aspects, a method for removing a threaded article from a mold section of an injection molding machine includes: (a) advancing a chuck of a removal device into engagement with the threaded article; (b) rotating the chuck about an unscrewing axis to unscrew the threaded article from the mold section; and (c) after step (a) and prior to step (b), retracting the chuck relative to the threaded article.

Further aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
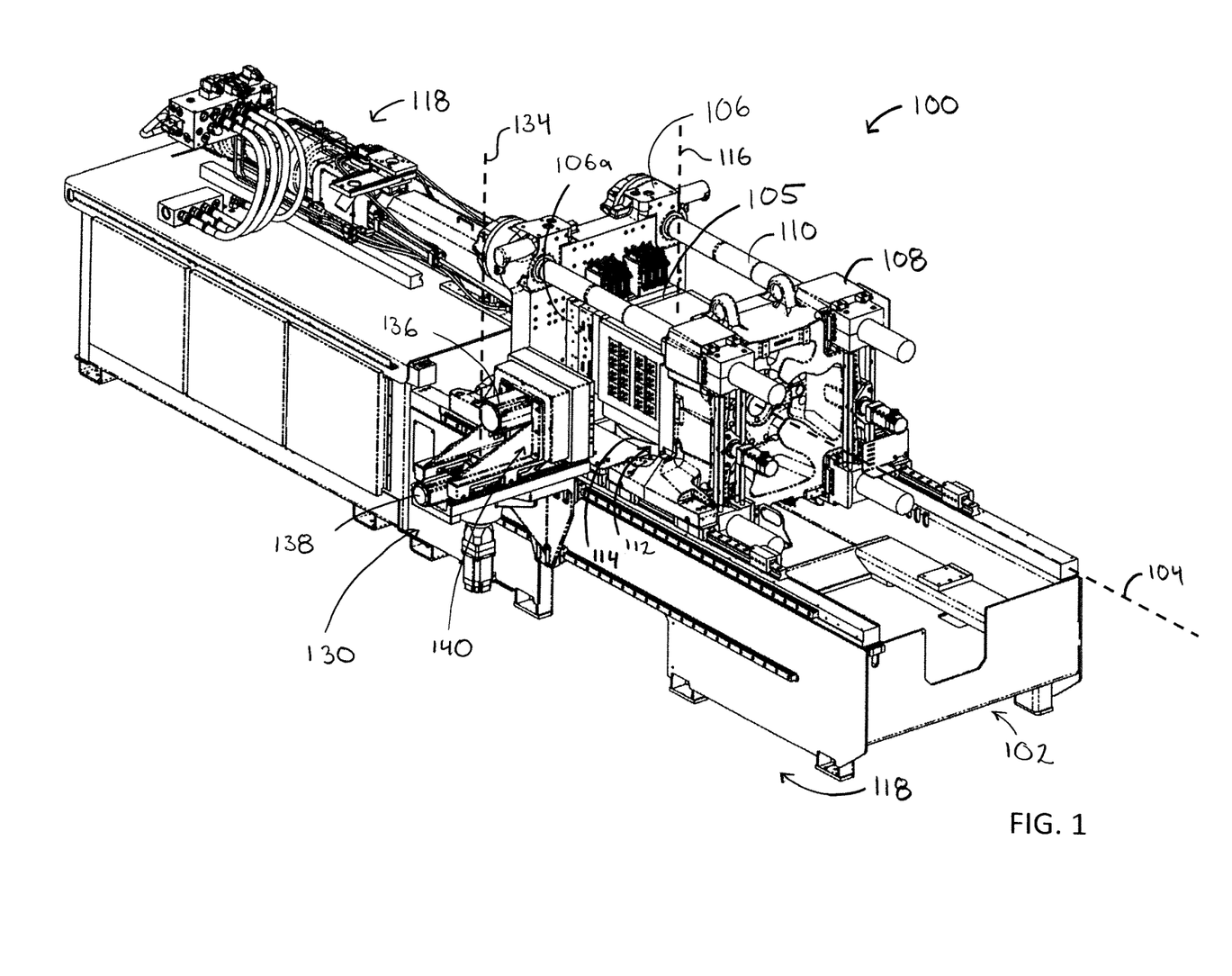
FIG. 1 is a perspective view of the non-operator side of an injection molding machine, showing a removal device in a first retracted condition and a first mold section in a molding condition.

Referring to FIG. 1, an example of an injection molding machine 100 includes a machine base 102 extending lengthwise along a generally horizontal machine axis 104. At least one first mold section 105 is supported by the base 102. In the example illustrated, the first mold section 105 includes a plurality of mold cores 107 (FIGS. 3A and 3B) for forming threaded articles.

Figure 3A:
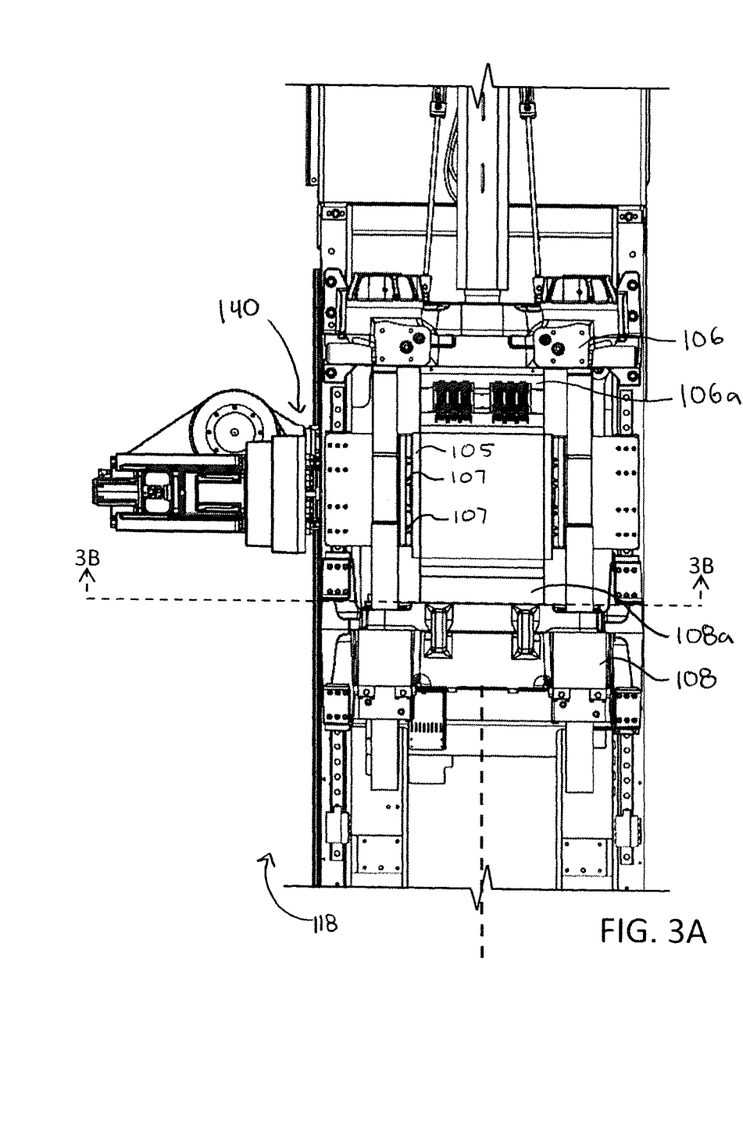
FIG. 3A is a plan view of a portion of the machine of FIG. 1, showing the removal device in the first retracted condition and the first mold section in an auxiliary condition.

In the example illustrated, a stationary platen 106 is fixed to the base 102 for supporting a second mold section 106a, and a moving platen 108 is slidably supported by the base 102 for supporting a third mold section 108a (FIG. 3A). The moving platen 108 is translatable towards and away from the stationary platen 106 along the machine axis 104. The stationary and moving platens 106, 108 are coupled together via tie bars 110.

Figure 3B:
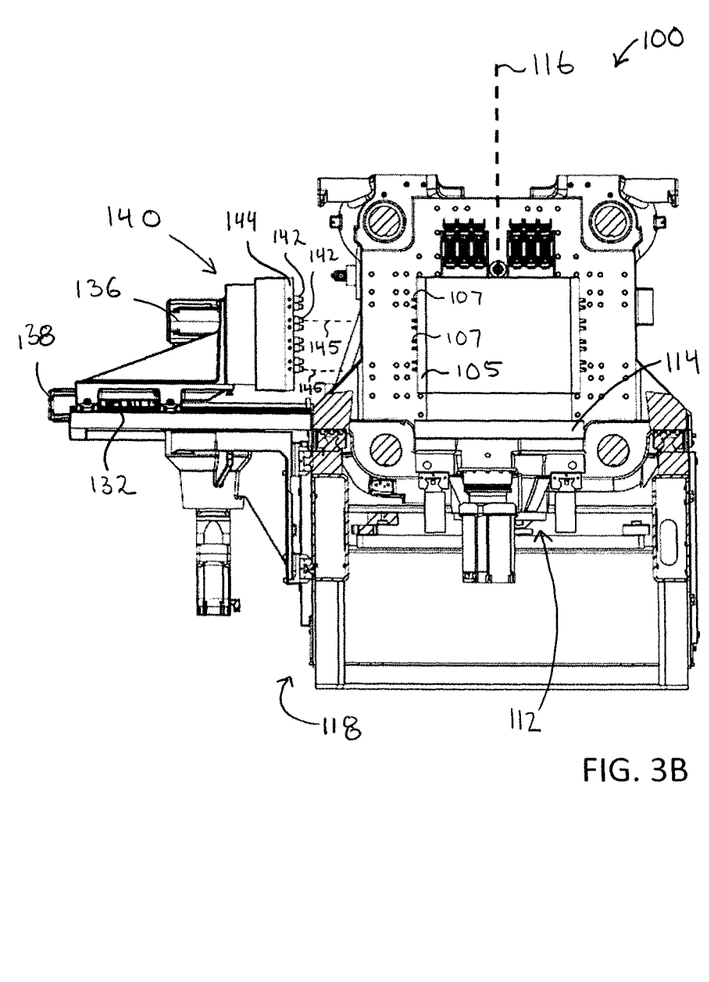
FIG. 3B a cross-sectional view of the machine of FIG. 1 taken along line 3B-3B in FIG. 3A.

In the example illustrated, the machine 100 includes a rotary apparatus 112 for rotatably supporting the first mold section 105 (see also FIG. 3B). In the example illustrated, the rotary apparatus 112 is slidably supported by the machine base 102 axially intermediate the stationary and moving platens 106, 108, and is translatable relative to the base 102 along the machine axis 104 for moving the first mold section 105 along the axis 104. When the machine 100 is in a mold-open condition, a table 114 of the rotary apparatus 112 is rotatable about a vertical axis 116 for moving the first mold section 105 about the axis 116 (see also FIG. 3B).

In the example illustrated, the mold cores 107 of the first mold section 105 are movable between a molding position (FIG. 1) for interacting with the second mold section 106a in a mold area to form threaded articles, and at least one auxiliary position (FIGS. 3A to 5B) outside the mold area. Referring to FIG. 3B, in the example illustrated, when in the auxiliary position, the mold cores 107 are directed toward a non-operator side 118 of the machine 100. Referring to FIG. 1, in the example illustrated, when in the molding position, the first mold section 105 is directed toward, and engagable with, the second mold section 106a. When the first mold section 105 is engaged with the second mold section 106a, the mold cores 107 of the first mold section 105 cooperate with a plurality of mold cavity portions of the second mold section 106a to form enclosed mold cavities to be filled with melt (e.g., from an injection unit 118) for forming the threaded articles.

Figure 2A:
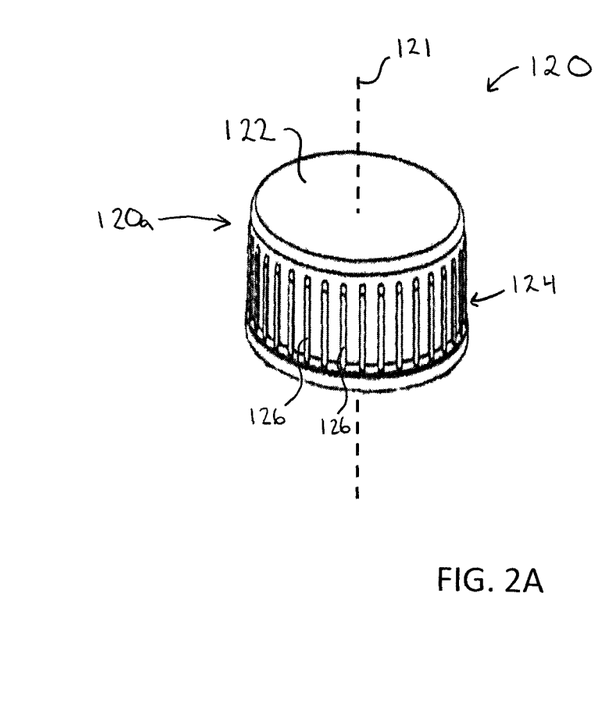
FIG. 2A is a top perspective view of an example threaded article.
Figure 2B:
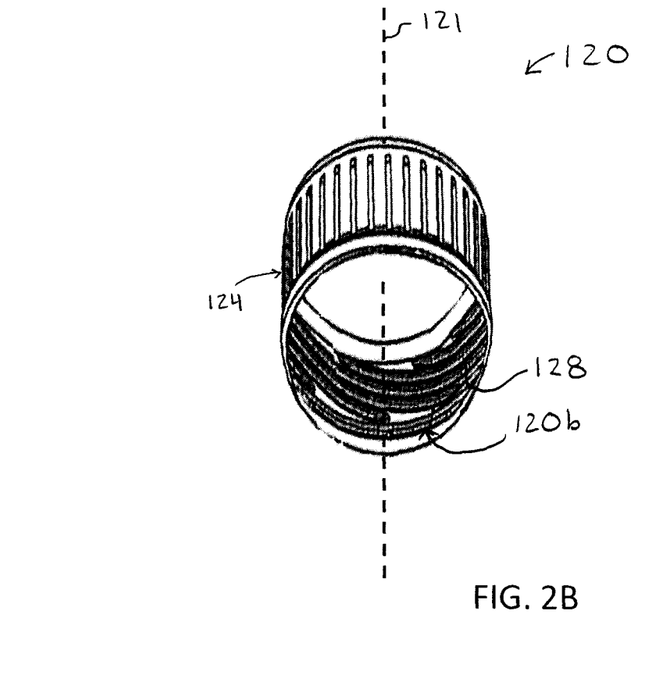
FIG. 2B is a bottom perspective view of the threaded article of FIG. 2A.

Referring to FIGS. 2A and 2B, a representative threaded article 120 is shown. In the example illustrated, the threaded article 120 is an internally threaded lid. The article 120 extends along an article axis 121, and includes an article exterior portion 120a and an article interior portion 120b.

Referring to FIG. 2A, in the example illustrated, the article exterior portion 120a includes a top surface 122 generally perpendicular to the article axis 121, and an outer surface of a skirt 124 extending downwardly from a periphery of the top surface 122 generally parallel to the article axis 121. The outer surface of the skirt 124 includes a plurality of ribs 126 spaced circumferentially apart about the article axis 121. Each rib 126 extends generally parallel to the article axis 121. The article exterior portions 120a of respective articles 120, including the ribs 126, are formed by mold cavity portions of a mold section, like the mold cavity portions of the second mold section 106a.

Referring to FIG. 2B, in the example illustrated, the article interior portion 120b includes an internal thread 128 extending along an inner surface of the skirt 124 generally helically about the article axis 121. The internal thread 128 can cooperate with an external thread of a container on which the threaded article 120 is to be installed. The article interior portions 120b of respective articles 120, including the internal threads 128, are formed by mold cores of a mold section, like the mold cores 107 of the first mold section 105.

Referring to FIG. 1, in the example illustrated, the machine 100 includes a part-handling apparatus 130 for handling threaded articles formed in the mold of the machine 100. The part-handling apparatus 130 includes a removal device 140 for removing the threaded articles from the mold cores 107 of the first mold section 105. The removal device 140 is disposed on the non-operator side 118 of the machine 100 for removing the threaded articles from the mold cores 107 when the mold cores 107 are in the auxiliary position.

Figure 7A:
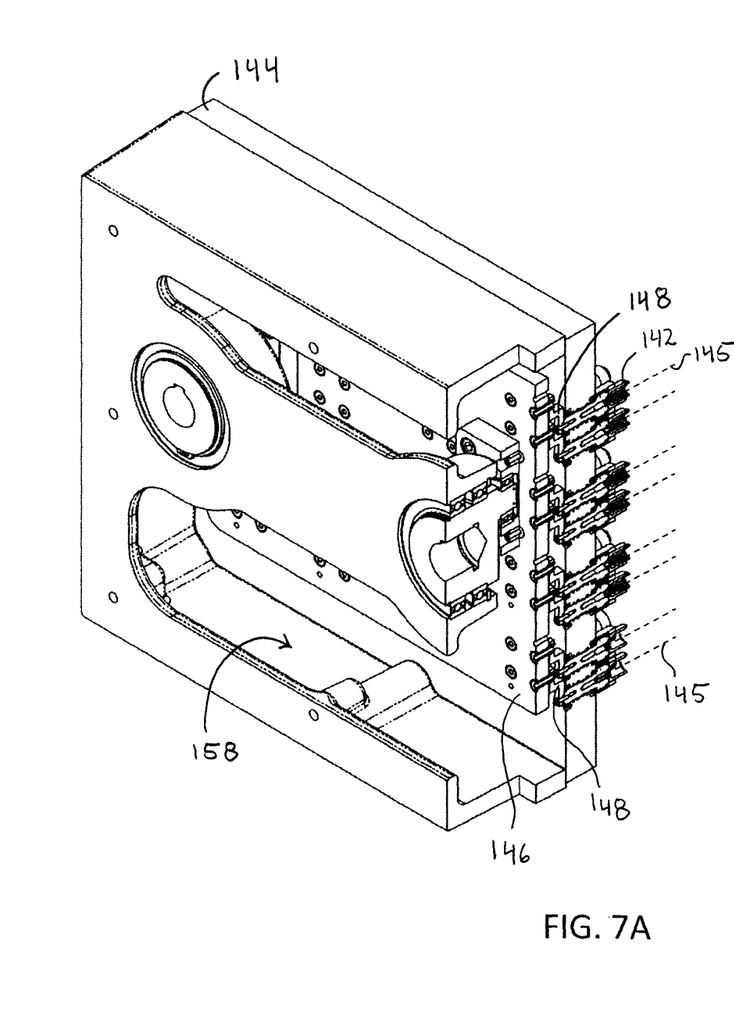
FIG. 7A is a rear perspective view of a portion of the removal device of FIG. 1.
Figure 7B:
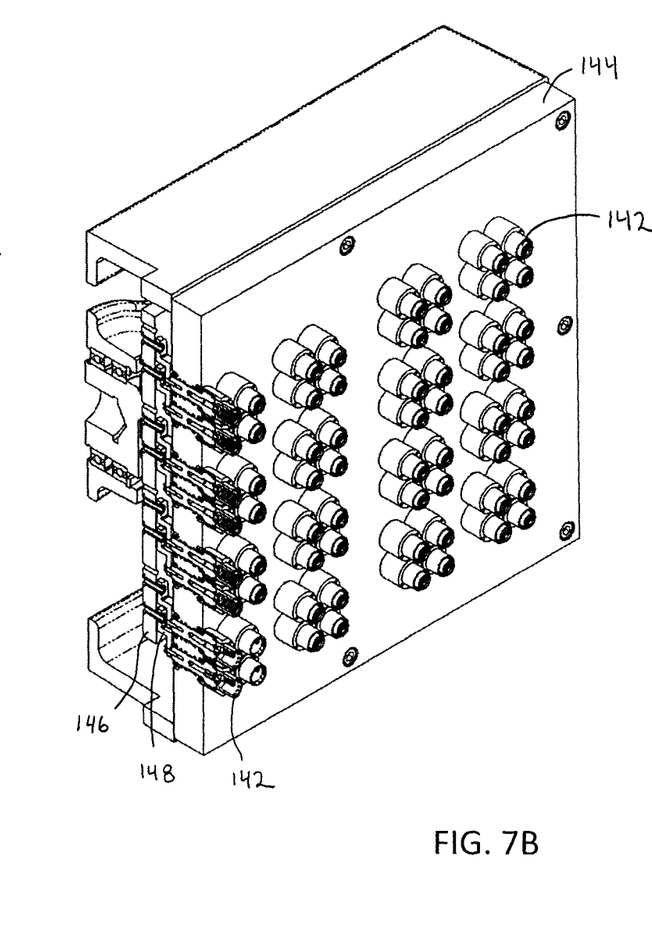
FIG. 7B is a front perspective view of the portion of the removal device of FIG. 7A.

Referring to FIG. 3B, in the example illustrated, the removal device 140 includes a plurality of unscrewing chucks 142 (see also FIG. 7B) for engaging the threaded articles when the mold cores 107 are in the auxiliary position. The chucks 142 are supported by a carrier plate 144 and are rotatable about respective unscrewing axes 145 for unscrewing the threaded articles from the mold cores 107.

Figure 6:
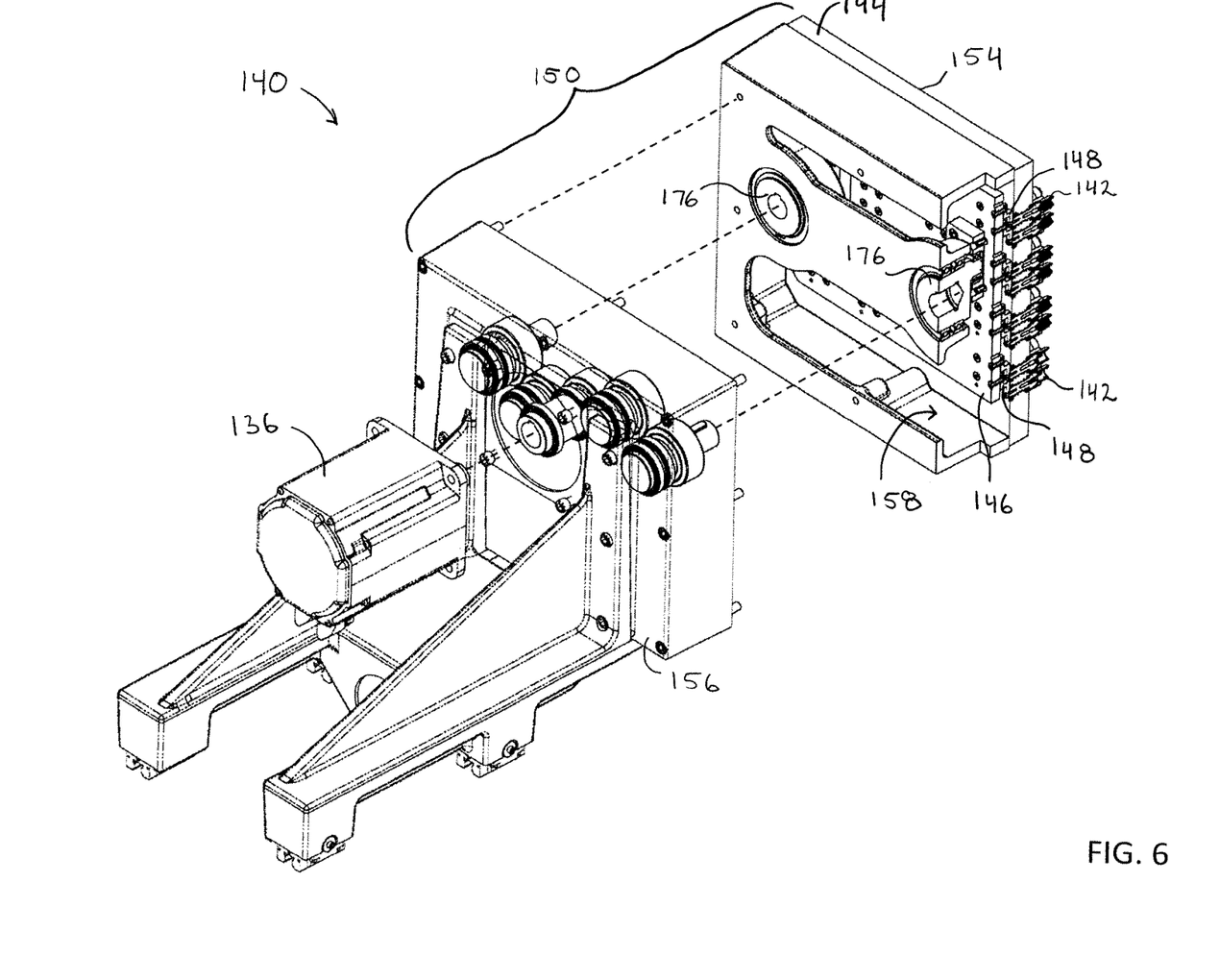
FIG. 6 is a rear perspective, partially exploded view of the removal device of FIG. 1.
Figure 8:
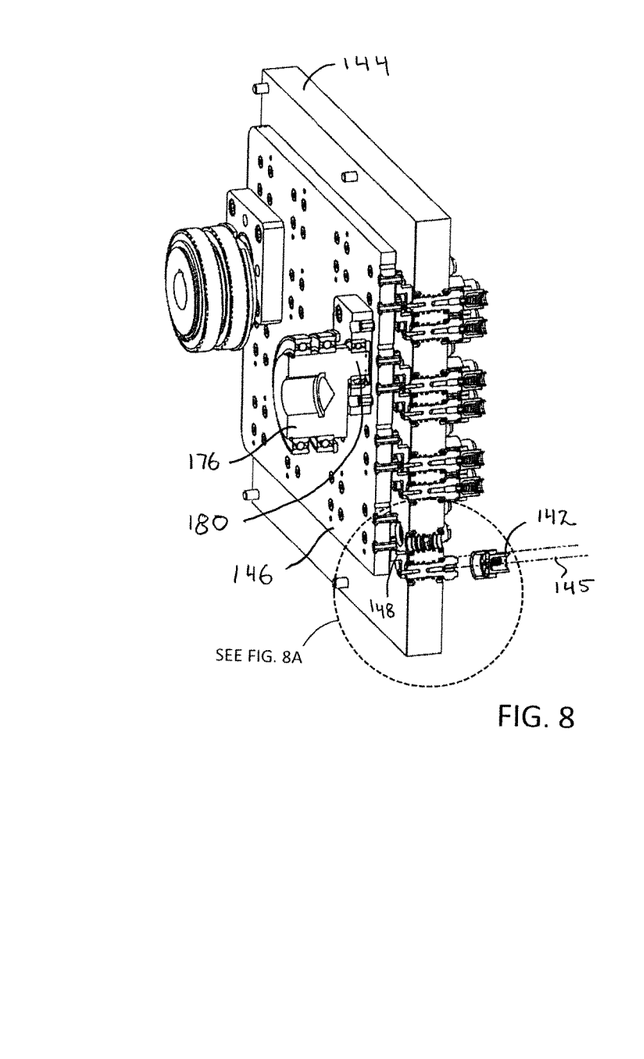
FIG. 8 is a rear perspective, cross-sectional, and partially exploded view of a portion of the removal device of FIG. 1.
Figure 8A:
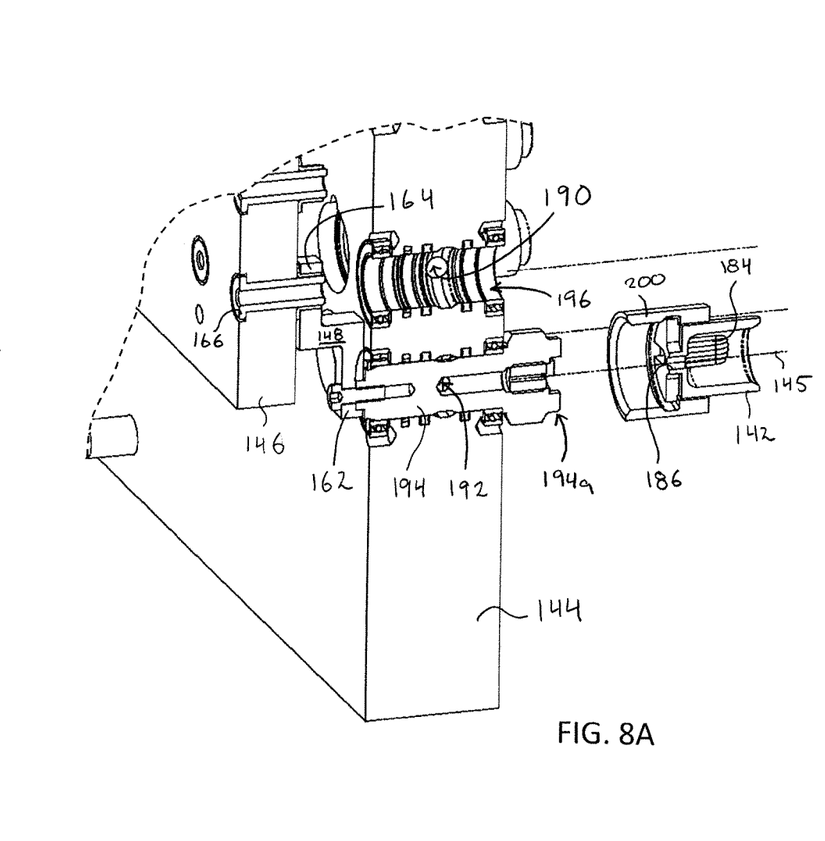
FIG. 8A is an enlarged view of a portion of FIG. 8.
Figure 9:
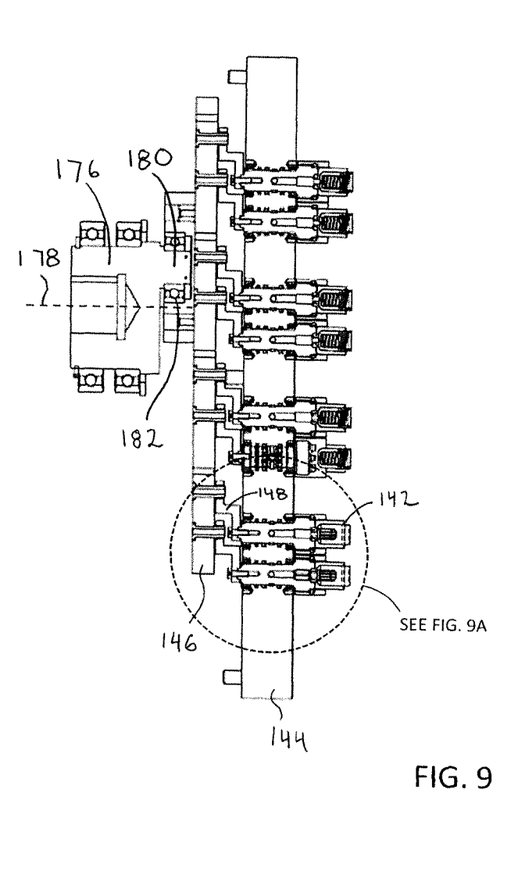
FIG. 9 is a side cross-sectional view of the portion of the removal device of FIG. 8.
Figure 9A:
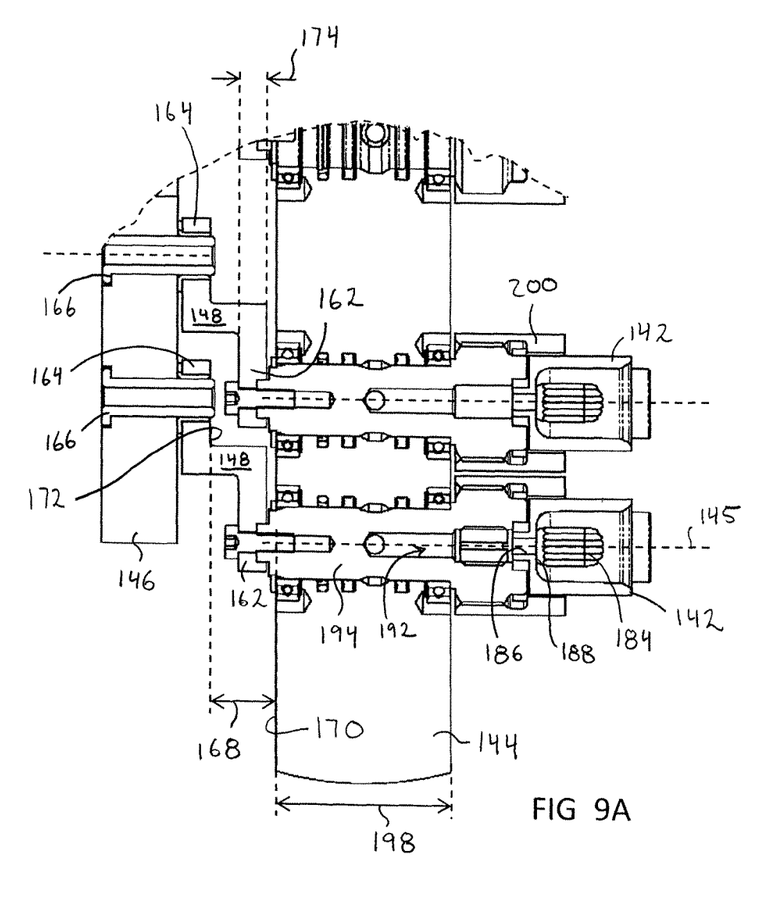
FIG. 9A is an enlarged view of a portion of FIG. 9.

Referring to FIG. 6, in the example illustrated, the removal device 140 further includes an orbiting plate 146 coupled to the unscrewing chucks 142 by respective crank arms 148 (see also FIGS. 8A and 9A). The orbiting plate 146 effects synchronized rotation of the unscrewing chucks 142 via the crank arms 148 for unscrewing the threaded articles from the mold cores 107. Each crank arm 148 transfers circular motion of the orbiting plate 146 to rotation of the respective unscrewing chuck 142 about the unscrewing axis 145.

In the example illustrated, the chucks 142 include grip members 184 (FIG. 9A) for contacting the threaded articles and inhibiting relative rotation between the unscrewing chucks 142 and the threaded articles. In the example illustrated, the grip members 184 comprise grooves extending parallel to the unscrewing axis 145 for receiving ribs (e.g., ribs 126) of the threaded article. The grip members 184 can receive the ribs in axial sliding fit to facilitate engagement and disengagement of the ribs by the grip members 184. The grip members 184 and the ribs are rotationally fixed relative to each other when engaged.

Referring to FIGS. 3A to 4B, in the example illustrated, the carrier plate 144 is movable from an advanced position (FIGS. 4A and 4B), in which the chucks 142 engage the threaded articles on the mold cores 107, to at least one retracted position (FIGS. 3A and 3B), in which the chucks 142 and threaded articles retained therein are clear of the mold cores 107.

In the example illustrated, the machine 100 includes an unscrewing slide 132 oriented parallel to the unscrewing axes 145 and supporting the carrier plate 144. The carrier plate 144 is retractable along the unscrewing slide 132 from the advanced position (FIGS. 4A and 4B) to a first retracted position (FIGS. 3A and 3B) in which the chucks 142 and threaded articles retained therein are clear of the mold cores 107.

Figure 5A:
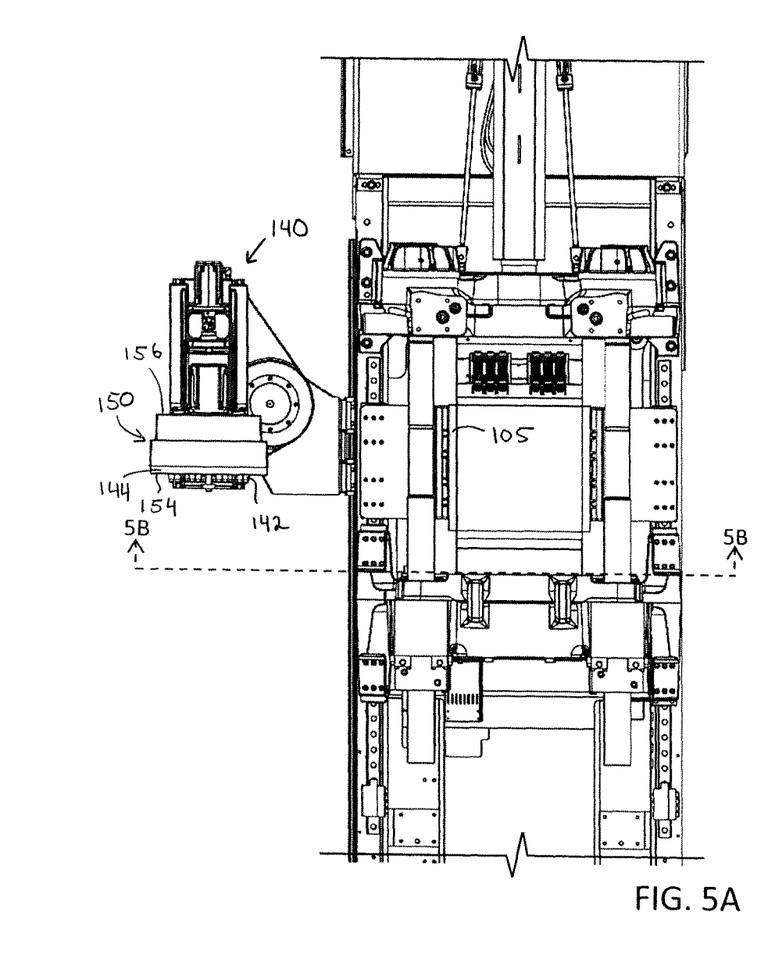
FIG. 5A is a plan view of a portion of the machine of FIG. 1, showing the removal device in a second retracted condition and the first mold section in the auxiliary condition.
Figure 5B:
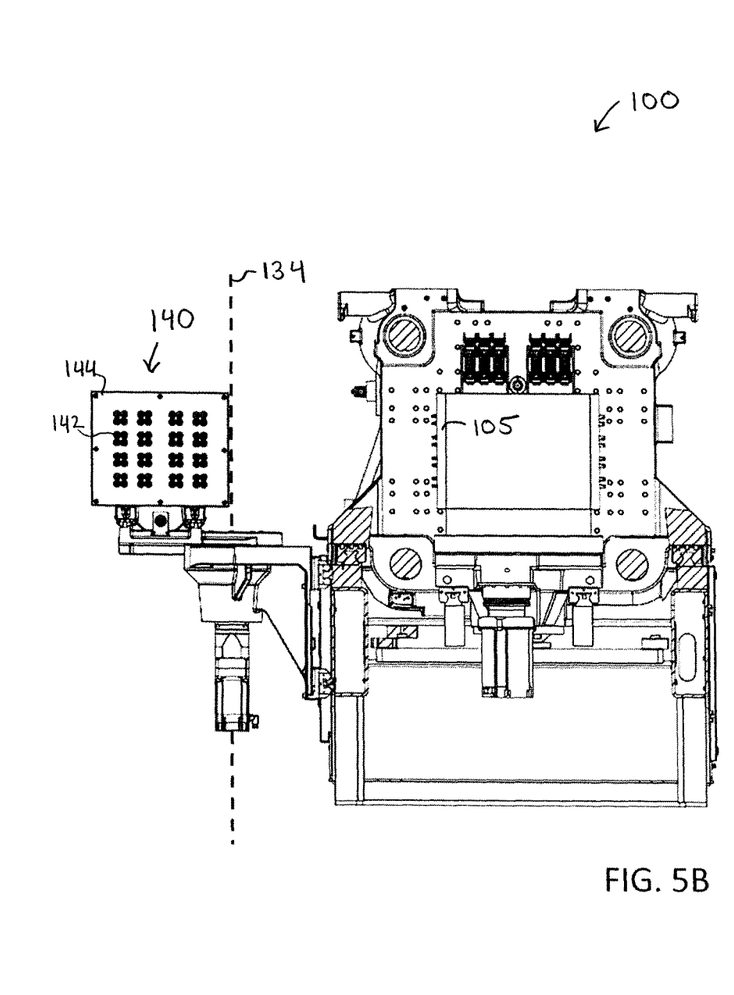
FIG. 5B is a cross-sectional view of the machine of FIG. 1 taken along line 5B-5B in FIG. 5A.

Referring to FIGS. 5A and 5B, in the example illustrated, the carrier plate 144 is further movable to a second retracted position spaced away from the first retracted position. The carrier plate 144 is, in the example illustrated, pivotable about a generally vertical pivot axis 134 to move between the first and second retracted positions. When in the second retracted position, the threaded articles can be removed from the chucks 142. For example, the threaded articles can be ejected from the chucks and dropped onto a conveyor. In some examples, the carrier plate 144 may be further pivotable about a generally horizontal axis to facilitate ejection and dropping of the threaded articles.

Figure 4A:
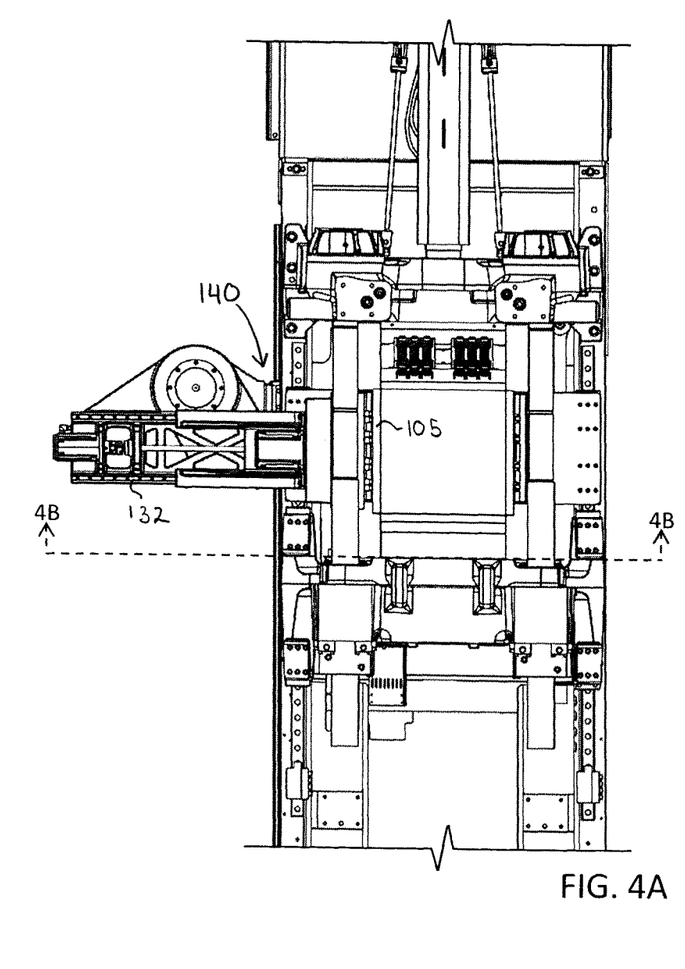
FIG. 4A is a plan view of a portion of the machine of FIG. 1, showing the removal device in an advanced condition and the first mold section in the auxiliary condition.
Figure 4B:
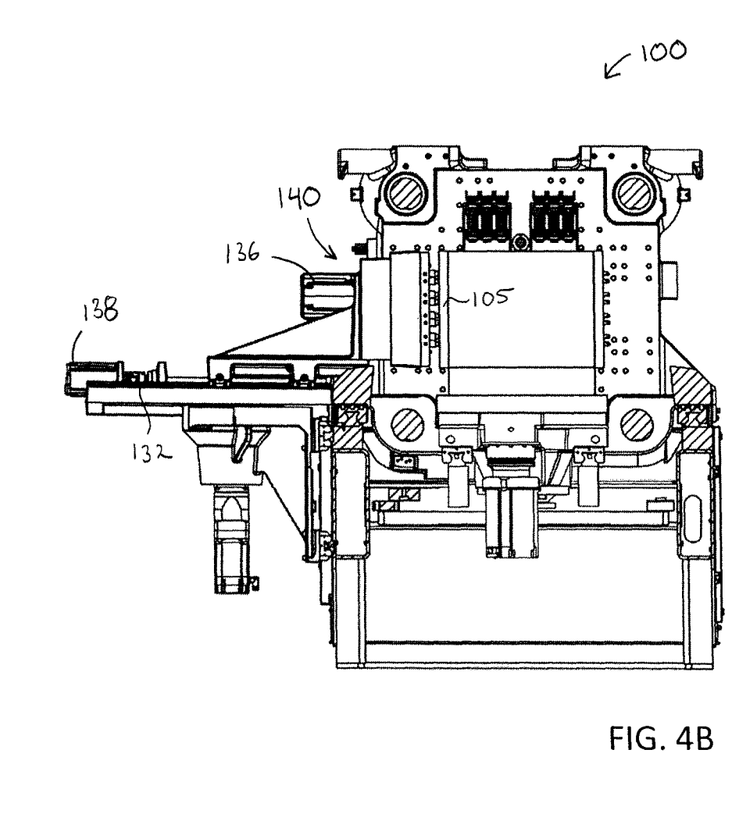
FIG. 4B a cross-sectional view of the machine of FIG. 1 taken along line 4B-4B in FIG. 4A.

Referring to FIGS. 3B and 4B, in the example illustrated, each unscrewing axis 145 is generally coaxial with a threaded article axis (e.g., threaded article axis 121) of a respective threaded article when the carrier plate 144 is in the advanced position and the first mold section is in the auxiliary position. In the example illustrated, each unscrewing chuck 142 accommodates axial translation of a respective threaded article along the respective unscrewing axis 145 during unscrewing of the threaded article from the mold cores 107 of the first mold section 105. In the example illustrated, each unscrewing chuck 142 translates along the respective unscrewing axis 145 during unscrewing of the threaded article from a mold core 107 of the first mold section 105. In the example illustrated, rotation of the unscrewing chucks 142 relative to respective mold cores 107 is synchronized with retraction of the carrier plate 144 (and the chucks 142) from the advanced position toward the first retracted position for unscrewing the articles from respective mold cores 107 without damaging the internal threads (e.g., the internal threads 128) of the threaded articles.

In the example illustrated, the machine 100 includes a first servomotor 136 for driving rotation of the chucks 142 via the orbiting plate 146, and a second servomotor 138 for moving the carrier plate 144 between the advanced position and the first retracted position. In the example illustrated, operation of the first and second servomotors 136, 138 is coordinated to synchronize retraction of the carrier plate 144 (and the chucks 142) with rotation of the chucks 142 to unscrew the threaded articles from respective mold cores 107 without damaging the internal threads of the articles.

In some cases, after the chucks 142 are advanced into engagement with respective threaded articles, some of the chucks 142 and respective threaded articles may become frozen together, as a result of, for example, the geometry of the threaded article and/or thermal effects. In such cases, it may be beneficial to retract the chucks 142 relative to the threaded articles prior to rotating the chucks 142. This may, for example, break away outer surfaces of the threaded articles from inner surfaces of respective chucks 142, and may facilitate subsequent ejection of the threaded articles from the chucks 142. For example, in one operating method, the chucks 142 are axially advanced by an engagement distance into rotationally locked engagement with threaded articles retained on the mold cores. After reaching a fully advanced axial position, and with the threaded article remaining in position on the mold cores, the chucks are axially retracted relative to the threaded articles by a fraction of the engagement distance, wherein each chuck is maintained in rotationally locked engagement with the respective threaded article and each chuck is in axially sliding fit with the respective threaded article. After the axial retraction, the chucks are rotated about their respective unscrewing axes to unscrew the threaded articles from the mold cores.

Referring to FIG. 6, in the example illustrated, the removal device 140 includes a housing 150 having a housing thickness extending between a front face of a front wall 154 and an opposed rear face of a rear wall 156 (see also FIG. 5A). The carrier plate 144 comprises the front wall 154 of the housing 150 in the example illustrated. The housing 150 defines an interior housing enclosure 158 (see also FIG. 7A). The orbiting plate 146 is disposed within the housing enclosure 158. The housing enclosure 158 can be at least partially filled with a lubricating fluid.

Referring to FIG. 9A, in the example illustrated, each crank arm 148 has an axial end 162 coupled to a respective unscrewing chuck 142. Each axial end 162 is fixed to rotate with the unscrewing chuck 142 about the respective unscrewing axis 145. Each crank arm 148 has an orbiting end 164 disposed radially outward of the unscrewing axis 145 and coupled to the orbiting plate 146 by, for example, a crank pin 166.

In the example illustrated, the orbiting ends 164 of the crank arms 148 are, in a direction parallel to the unscrewing axes 145, spaced farther away from the carrier plate 144 than the axial ends 162 of the crank arms 148 to provide an offset gap 168 between a back surface 170 of the carrier plate 144 and a facing surface 172 of the orbiting ends 164 of each crank arm 148.

Referring again to FIG. 9A, in the example illustrated, the offset gap 168 is greater than an axial end thickness 174 of the axial end 162 of each crank arm 148, the axial end thickness 174 measured in a direction parallel to the unscrewing axis 145. In the example illustrated, each offset gap 168 accommodates a portion of the axial end 162 of an adjacent crank arm 148 during operation of the orbiting plate 146. Each orbiting end 164 traces a circle coaxial with the respective unscrewing axis 145 of the unscrewing chuck 142 to which it is coupled. At points along this circular path, the orbiting end 164 will overlie the axial end 162 of an adjacent crank arm.

Referring to FIG. 9, in the example illustrated, the machine 100 includes at least one drive shaft 176 for effecting circular motion of the orbiting plate 146. The drive shaft 176 is rotatable about a drive axis 178 disposed in fixed position relative to the carrier plate 144. The drive shaft 176 can be coupled to the orbiting plate 146 by a drive pin 180 disposed radially outward of the drive axis 178. In the example illustrated, the drive pin 180 is fixed to the drive shaft 176, and is received in a bearing 182 mounted in fixed position to the orbiting plate 146.

Referring to FIG. 9A, in the example illustrated, each unscrewing chuck 142 includes a fluid orifice 186 in communication with a fluid source for establishing at least one of positive pressure and negative pressure between a proximate surface 188 of the unscrewing chuck 142 and an adjacent surface (e.g., the top surface 122) of the threaded article. Providing negative pressure can help retain the threaded article in the chuck 142, for example, when the carrier plate 144 moves from the advanced position to the first retracted position, and/or from the first retracted position to the second retracted position. Providing positive pressure can help eject the molded articles from the chucks 142, for example, when the carrier plate 144 is in the second retracted position.

Referring to FIG. 8A, in the example illustrated, the machine 100 includes a header conduit 190 fixed to the carrier plate 144 and in communication with the fluid source. The machine 100 further includes at least one branch conduit 192 providing fluid communication between the header conduit 190 and the fluid orifice 186 of at least one unscrewing chuck 142.

In the example illustrated, each unscrewing chuck 142 is supported by a respective spindle 194 received in a respective carrier plate bore 196 passing through a carrier plate thickness 198 (FIG. 9A) of the carrier plate 144. Each unscrewing chuck 142 is releasably coupled to a front end 194a of the respective spindle 194. In the example illustrated, each chuck 142 is axially locked relative to the carrier plate 1144 via a respective retaining sleeve 200. Each retaining sleeve 200 is releasably coupled to a respective spindle 194.

In the example illustrated, the branch conduit 192 extends through at least a portion of the spindle 194. In the example illustrated, at least a portion of the header conduit 190 can be disposed in the carrier plate thickness 198 of the carrier plate 144.

Referring to FIGS. 10A to 11A, portions of an alternative removal device 1140 for use with the machine 100 is shown. The removal device 1140 has similarities to the removal device 140, and like features are identified by like reference characters, incremented by 1000.

In the example illustrated, the removal device 1140 includes a plurality of unscrewing chucks 1142. The chucks 1142 are supported by a carrier plate 1144. In the example illustrated, each unscrewing chuck 1142 is supported by a respective spindle 1194 received in a respective carrier plate bore 1196 passing through a carrier plate thickness of the carrier plate 1144. Each unscrewing chuck 1142 is releasably coupled to a front end 1194a (FIG. 10A) of the respective spindle 1194.

In the example illustrated, the removal device 1140 includes a retaining plate 1202 removably mounted to a front surface of the carrier plate 1144. In the example illustrated, each chuck 142 is axially locked relative to the carrier plate 1144 via the retaining plate 1202. This may facilitate more efficient removal and/or replacement of the chucks 1142.

Figure 10:
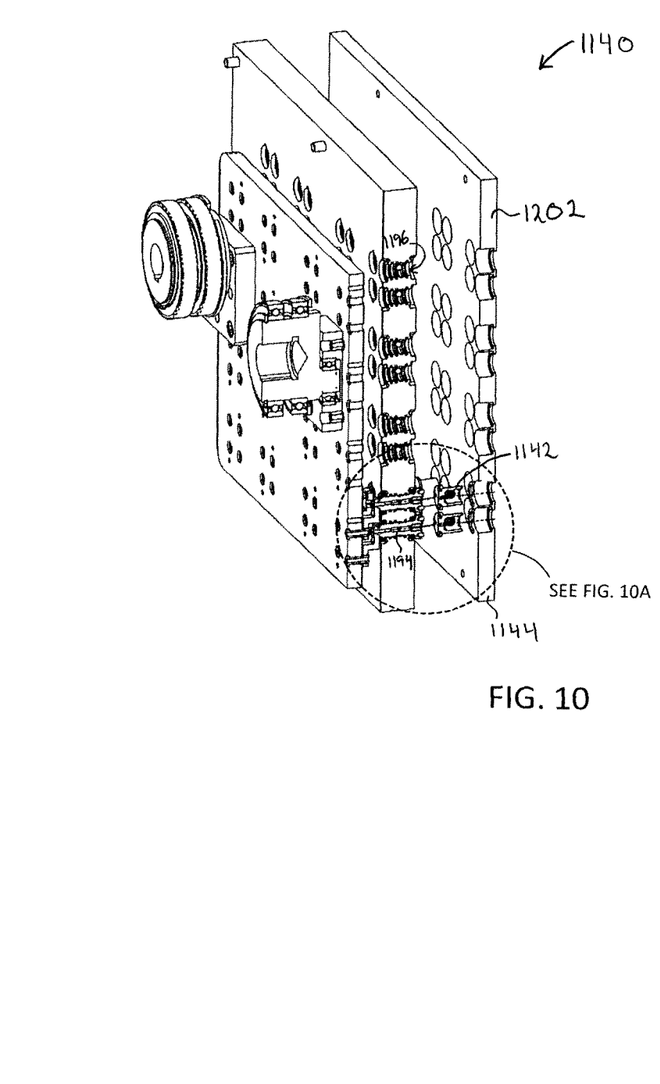
FIG. 10 is a rear perspective, cross-sectional, and partially exploded view of a portion of an alternative removal device for use with an injection molding machine like that of FIG. 1.
Figure 10A:
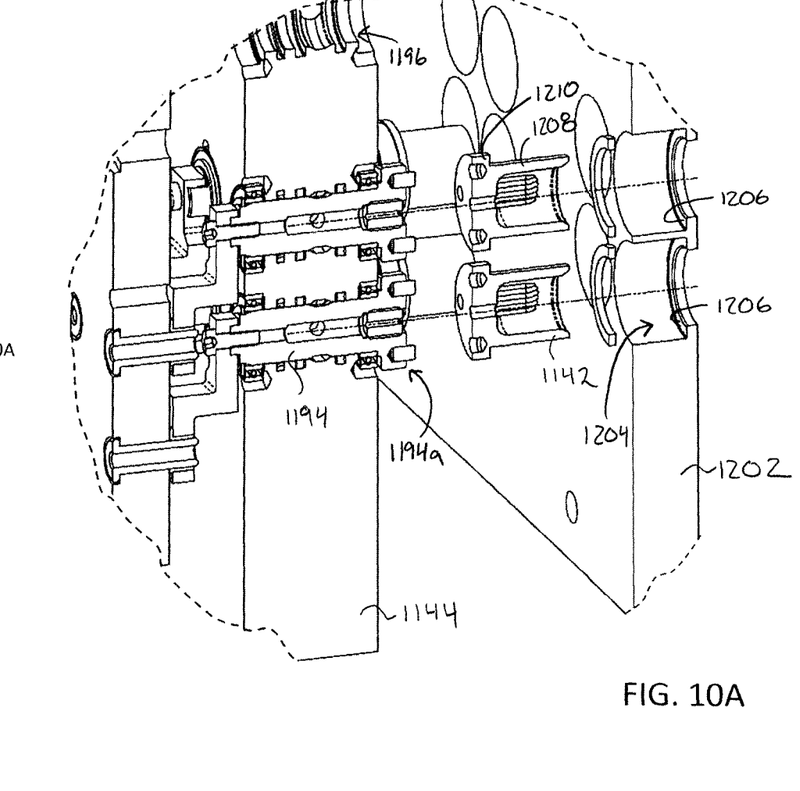
FIG. 10A is an enlarged view of a portion of FIG. 10.
Figure 11:
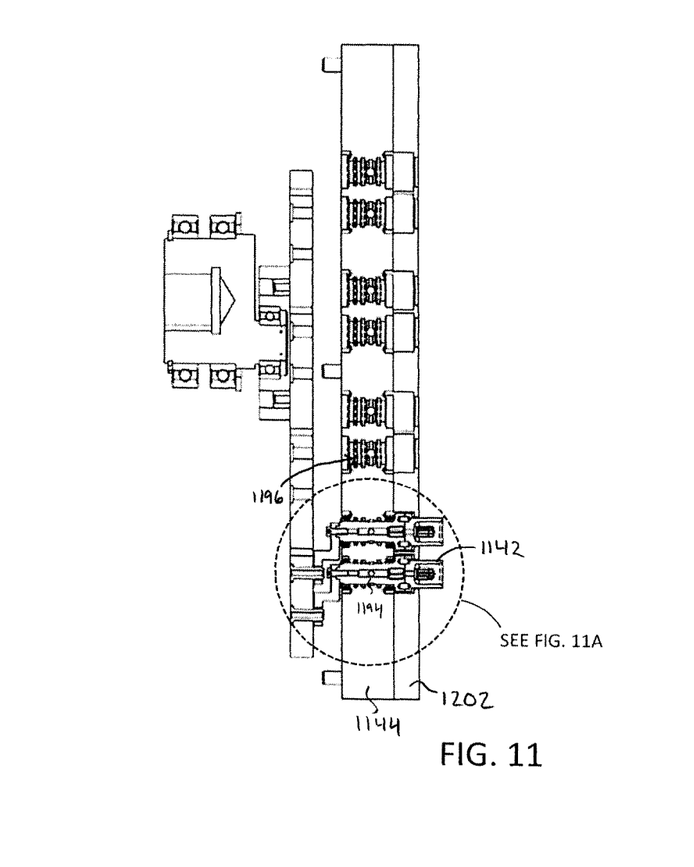
FIG. 11 is a side cross-sectional view of the portion of the removal device of FIG. 10.
Figure 11A:
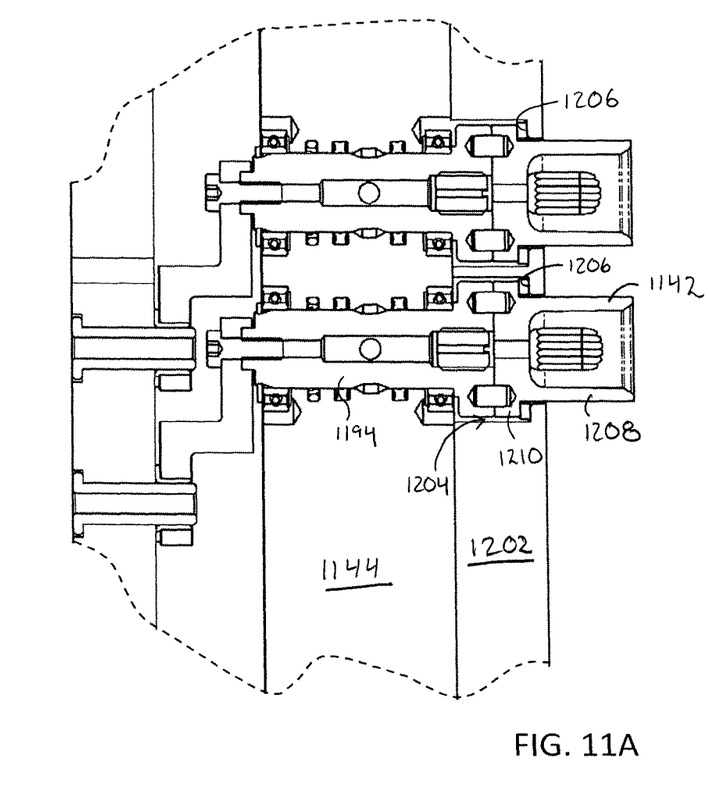
FIG. 11A is an enlarged view of a portion of FIG. 11.

Referring to FIG. 10A, in the example illustrated, the retaining plate 1202 includes a plurality of retaining plate bores 1204 passing through a retaining plate thickness of the retaining plate 1202. Each retaining plate bore 1204 has a stepped surface 1206 directed toward the front end 1194a of a respective spindle 1194. In the example illustrated, each chuck 1142 includes a body 1208 and a flange portion 1210 extending radially outwardly from the body 1208. Referring to FIG. 11A, the flange portion 1210 of each chuck 1142 is retained axially intermediate the stepped surface 1206 of a respective retaining plate bore 1204 and the front end 1194a of a respective spindle 1194.

Figure 12A:
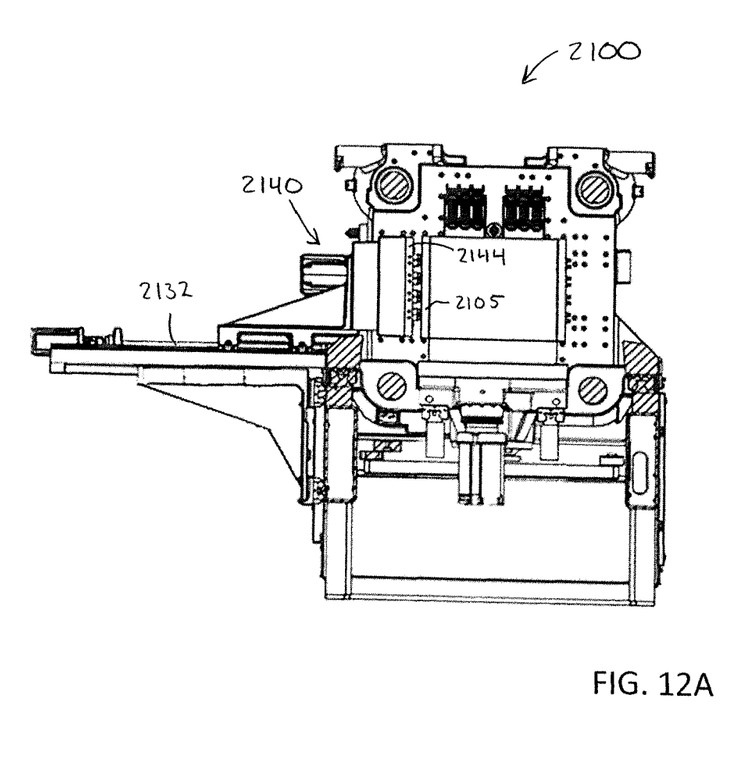
FIG. 12A is a cross-sectional view of a machine like that of FIG. 1, showing an alternative removal device in a retracted condition.
Figure 12B:
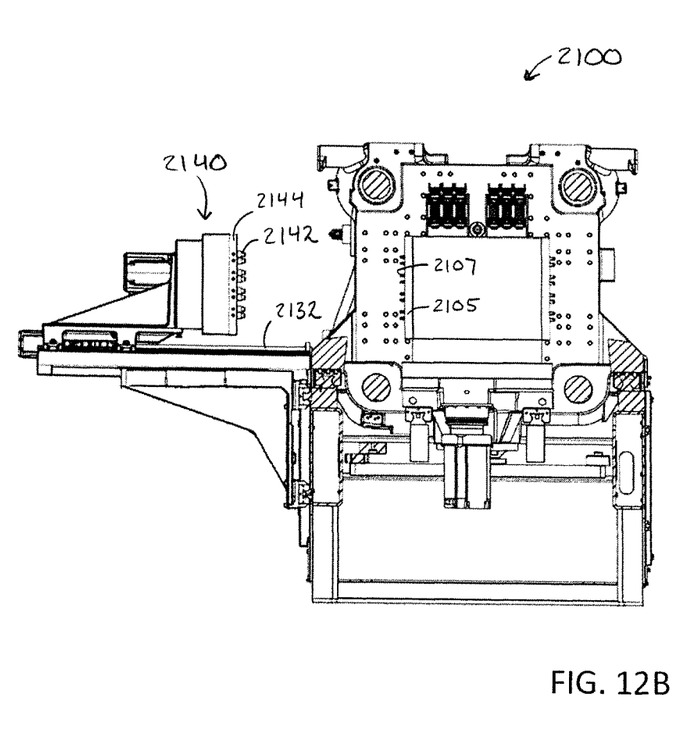
FIG. 12B is a cross-sectional view like that of FIG. 12A, showing the removal device of FIG. 12A in an advanced condition.

Referring to FIGS. 12A and 12B, an alternative injection molding machine 2100 is shown. The machine 2100 has similarities to the machine 100, and like features are identified by like reference characters, incremented by 2000.

In the example illustrated, the machine 2100 includes a removal device 2140 for removing threaded articles from mold cores 2107 of a first mold section 2105. In the example illustrated, a carrier plate 2144 of the removal device 2140 is movable from an advanced position (FIG. 12A), in which chucks 2142 of the removal device 2140 engage threaded articles on the mold cores 2107, to at least one retracted position (FIG. 12B), in which the chucks 2142 and the threaded articles retained therein are clear of the mold cores 2107. The carrier plate 2144 is retractable along an unscrewing slide 2132 from the advanced position to the retracted position. When in the retracted position, the threaded articles can be removed from the chucks 2142. For example, the threaded articles can be ejected from the chucks 2142 and dropped onto a conveyor below the carrier plate 2144.

While the above description provides examples of one or more processes or apparatuses, it will be appreciated that other processes or apparatuses may be within the scope of the accompanying claims.

What is claimed is:

1. An injection molding machine, comprising:
   a) a first mold section comprising mold cores for forming threaded articles, the first mold cores movable between a molding position for interacting with a second mold section in a mold area to form the threaded articles, and an auxiliary position outside the mold area;
   b) a removal device for removing the threaded articles from the mold cores, the removal device including:
      a plurality of unscrewing chucks for engaging the threaded articles when the mold cores are in the auxiliary position, the chucks supported by a carrier plate and each chuck rotatable about a respective unscrewing axis; and
      an orbiting plate coupled to the unscrewing chucks by respective crank arms, the orbiting plate effecting synchronized rotation of the unscrewing chucks via the crank arms for unscrewing the threaded articles from the mold cores.

2. The machine of claim 1, wherein each crank arm transfers circular motion of the orbiting plate to rotation of a respective one of the unscrewing chucks about the respective unscrewing axis.

3. The machine of claim 1, wherein each crank arm has an axial end that is coupled to a respective one of the unscrewing chucks and is fixed to rotate with the respective unscrewing chuck about the respective unscrewing axis, and an orbiting end disposed radially outward of the respective unscrewing axis and coupled to the orbiting plate by a crank pin.

4. The machine of claim 3, wherein the orbiting ends of the crank arms are, in a direction parallel to the unscrewing axes, spaced further away from the carrier plate than the axial ends of the crank arms by an amount equal to a crank arm offset, the crank arm offset providing an offset gap between a back surface of the carrier plate and a facing surface of the orbiting ends of each crank arm.

5. The machine of claim 4, wherein each crank arm has an axial end thickness measured in a direction parallel to the respective unscrewing axis, and the offset gap is greater than the axial end thickness.

6. The machine of claim 4, wherein each offset gap accommodates a portion of the axial end of an adjacent crank arm during operation of the orbiting plate.

7. The machine of claim 1, further comprising at least one drive shaft for effecting circular motion of the orbiting plate, the drive shaft rotatable about a drive axis disposed in fixed position relative to the carrier plate, and the drive shaft coupled to the orbiting plate by a drive pin disposed radially outward of the drive axis.

8. The machine of claim 7, wherein the drive pin is fixed to the drive shaft and is received in a bearing mounted in fixed position to the orbiting plate.

9. The machine claim 1, wherein the unscrewing chucks comprise grip members for contacting the threaded articles and inhibiting relative rotation between the unscrewing chucks and the threaded articles.

10. The machine of claim 1, wherein each unscrewing chuck comprises a fluid orifice in communication with a fluid source for establishing at least one of positive pressure and negative pressure between a proximate surface of the unscrewing chuck and an adjacent surface of the threaded article.

11. The machine of claim 10, further comprising a header conduit fixed to the carrier plate and in communication with the fluid source, and at least one branch conduit providing fluid communication between the header conduit and the fluid orifice of at least one of the unscrewing chucks.

12. The machine of claim 11, wherein each unscrewing chuck is supported by a respective spindle received in a respective bore passing through a thickness of the carrier plate, and the branch conduit extends through at least a portion of the spindle.

13. The machine of claim 12, wherein at least a portion of the header conduit is disposed in the thickness of the carrier plate.

14. The machine of claim 1, wherein the carrier plate comprises a front wall of a housing, the housing defining an interior housing enclosure and the orbiting plate disposed within the housing enclosure.

15. The machine of claim 14, wherein the housing enclosure is at least partially filled with a lubricating fluid.

16. The machine of claim 1, wherein the carrier plate is movable from a plate advanced position in which the chucks engage the threaded articles on the mold cores, to at least one plate retracted position in which the chucks and threaded articles retained therein are clear of the mold cores.

17. The machine of claim 16, further comprising an unscrewing slide oriented parallel to the unscrewing axis, the carrier plate supported by the unscrewing slide and retractable along the unscrewing slide to a first plate retracted position.

18. The machine of claim 16, wherein the carrier plate is movable to a second plate retracted position spaced away from the first plate retracted position.

19. The machine of claim 18, wherein the carrier plate is pivotable about a generally vertical pivot axis to move between the first plate retracted and second plate retracted positions.

20. A removal device for removing threaded articles from a mold section of an injection molding machine, the device comprising:

a) a carrier plate;

b) a plurality of unscrewing chucks supported by the carrier plate, each chuck rotatable about a respective unscrewing axis;

c) an orbiting plate coupled to the unscrewing chucks by a plurality of crank arms, the orbiting plate effecting synchronized rotation of the unscrewing chucks via the crank arms for unscrewing respective threaded articles from the mold section.

21. The device of claim 19, wherein each unscrewing chuck accommodates axial translation of a respective threaded article along the respective unscrewing axis during said unscrewing from the mold section.

22. The device of claim 20, wherein each unscrewing chuck translates along the respective unscrewing axis during said unscrewing from the mold section.

23. The device of claim 21, wherein each unscrewing chuck is supported by a respective spindle received in a respective bore passing through a thickness of the carrier plate.

24. The device of claim 22, wherein each unscrewing chuck is releasably coupled to a front end of the respective spindle.

* * * * *